(12) United States Patent
Jaynes

(10) Patent No.: US 9,771,041 B2
(45) Date of Patent: Sep. 26, 2017

(54) FRAME EXTENSION FOR VEHICLE AND METHOD

(71) Applicant: Fontaine Modification Company, Charlotte, NC (US)

(72) Inventor: Dan R. Jaynes, Mount Holly, NC (US)

(73) Assignee: Fontaine Modification Company, Charlotte, NC (US)

( * ) Notice: Subject to any disclaimer, the term of this patent is extended or adjusted under 35 U.S.C. 154(b) by 15 days.

(21) Appl. No.: 14/687,077

(22) Filed: Apr. 15, 2015

(65) Prior Publication Data

US 2015/0291107 A1     Oct. 15, 2015

Related U.S. Application Data

(60) Provisional application No. 61/979,782, filed on Apr. 15, 2014.

(51) Int. Cl.
| | |
|---|---|
| *F16M 11/00* | (2006.01) |
| *B60R 19/48* | (2006.01) |
| *B60D 1/48* | (2006.01) |
| *B62D 25/20* | (2006.01) |
| *B60D 1/56* | (2006.01) |
| *B60D 1/52* | (2006.01) |
| *B62D 21/02* | (2006.01) |

(52) U.S. Cl.
CPC .............. *B60R 19/48* (2013.01); *B60D 1/488* (2013.01); *B60D 1/52* (2013.01); *B60D 1/56* (2013.01); *B62D 21/02* (2013.01); *B62D 25/209* (2013.01)

(58) Field of Classification Search
CPC ........ B62D 25/209; B60D 1/488; B60D 1/56; B60D 1/52; B60D 1/565

USPC .................................................. 248/300, 200
See application file for complete search history.

(56) References Cited

U.S. PATENT DOCUMENTS 2,486,161 A * 10/1949 Hughes .................... B60D 1/56
                                                                    280/502
4,109,930 A *  8/1978 Pilhall ..................... B60D 1/54
                                                                    280/491.4

(Continued)

FOREIGN PATENT DOCUMENTS

| FR | EP 2596966 A1 * | 5/2013 | ............... B60D 1/02 |
| KR | DE 102012105857 A1 * | 5/2013 | ............... B60D 1/06 |
| SE | EP 1932690 A1 * | 6/2008 | ............... B60D 1/02 |

*Primary Examiner* — Kimberly Wood
(74) *Attorney, Agent, or Firm* — Andrus Intellectual Property Law, LLP

(57) ABSTRACT

An extension for a vehicle having a frame rail and a cross member with a top flange and a bottom flange, with the cross member connected to the frame rail. The extension includes a top bracket having a vertical portion and a top horizontal member, where the top bracket vertical portion has a leading end portion and a trailing end portion. The trailing end portion is adapted to be attached to the frame rail and the top horizontal member is adapted to engage the cross member top flange. An outer plate is attached to the leading end portion of the vertical portion of the top bracket and has a middle horizontal member. A spacer block is positioned between and attached to the top and middle horizontal members. A bottom bracket has a vertical portion and a bottom horizontal member. The bottom bracket vertical portion is attached to the outer plate and the bottom horizontal member is adapted to be attached to the bottom flange of the cross member.

15 Claims, 4 Drawing Sheets

(56) References Cited

U.S. PATENT DOCUMENTS

| | | | | |
|---|---|---|---|---|
| 4,204,702 A * | 5/1980 | Oltrogge | B60D 1/075 | 280/491.5 |
| 4,738,464 A * | 4/1988 | Putnam | B60D 1/485 | 280/500 |
| 5,823,287 A * | 10/1998 | Chidamparam | B60K 17/00 | 180/312 |
| 6,139,092 A * | 10/2000 | Doner | B60G 11/10 | 293/138 |
| 7,198,282 B2 * | 4/2007 | Burchett | B62D 53/0807 | 280/433 |
| 7,322,553 B2 * | 1/2008 | Rexroad | E04G 21/3261 | 182/138 |
| D575,220 S * | 8/2008 | Pockalny | D12/223 | |
| 7,540,453 B2 * | 6/2009 | Liu | G03B 21/54 | 248/65 |
| D610,439 S * | 2/2010 | Wood | D8/381 | |
| 8,844,180 B2 * | 9/2014 | Kludt | F16B 2/12 | 248/223.41 |
| 9,016,643 B2 * | 4/2015 | Sterling | B60D 1/488 | 248/200 |
| 2001/0035628 A1 * | 11/2001 | McCoy | B60D 1/52 | 280/495 |
| 2003/0178834 A1 * | 9/2003 | Grimm | B62D 21/12 | 280/781 |
| 2004/0148778 A1 * | 8/2004 | Fleming | B62D 21/02 | 29/897.2 |
| 2005/0116459 A1 * | 6/2005 | Ito | B62D 21/02 | 280/781 |
| 2006/0006626 A1 * | 1/2006 | Scruggs | B60D 1/06 | 280/495 |
| 2006/0055162 A1 * | 3/2006 | Beckmann | B60G 7/02 | 280/781 |
| 2007/0216147 A1 * | 9/2007 | Ramsey | B60G 7/02 | 280/781 |
| 2008/0001383 A1 * | 1/2008 | Hodoya | B60D 1/56 | 280/477 |
| 2010/0038881 A1 * | 2/2010 | Ford | B60D 1/015 | 280/416.1 |
| 2010/0181786 A1 * | 7/2010 | Tejler | B60D 1/02 | 293/130 |
| 2011/0204594 A1 * | 8/2011 | Garth | B60D 1/01 | 280/491.1 |
| 2013/0113182 A1 * | 5/2013 | Keatley | B60D 1/01 | 280/495 |
| 2013/0277945 A1 * | 10/2013 | McCoy | B60D 1/485 | 280/495 |
| 2014/0346299 A1 * | 11/2014 | Sterling | B60D 1/488 | 248/228.1 |
| 2015/0008658 A1 * | 1/2015 | Keatley | B62D 21/02 | 280/495 |

* cited by examiner

FRAME EXTENSION FOR VEHICLE AND METHOD

CROSS REFERENCE TO RELATED APPLICATIONS

This application claims priority to U.S. Provisional Patent Application No. 61/979,782, filed Apr. 15, 2014, the entire contents of which is hereby incorporated by reference.

FIELD OF THE INVENTION

The present invention relates generally to commercial vehicles and, in particular, to a frame extension that permits accessories to be installed on the front end of such vehicles.

BACKGROUND

Commercial or vocational vehicles, such as medium or heavy duty trucks, are used for a variety of applications. It may be desirable to attach accessories to a truck for use in a particular application. Such accessories may include, but are not limited to, snow plows, wenches, hose reels, tread plates, auxiliary bumpers, crash bars, brush guards or pavement spreaders. These accessories are typically attached to the front of the truck.

Accessories such as those described above, may generate very heavy loads during use and are thus preferably attached to the frame of the truck as that typically is the strongest structure of the vehicle. Oftentimes the space available to access the frame rails on the front of the truck to attach the accessories is very limited. For example, the truck front bumper may be positioned close to the front or leading ends of the frame rails.

In view of the above, it is desirable to provide a frame extension and method that permits accessories to be economically and securely installed to the frames vehicles.

DETAILED DESCRIPTION OF EMBODIMENTS

While the invention is described below in terms of installation onto the front of a truck, it should be understood that the invention could be used on other types of vehicles and installed in alternative locations on the vehicle. In addition, while embodiments of the invention are described below as using bolts for attachments, alternative fasteners and attachment methods known in the art may be used.

Figure 1:
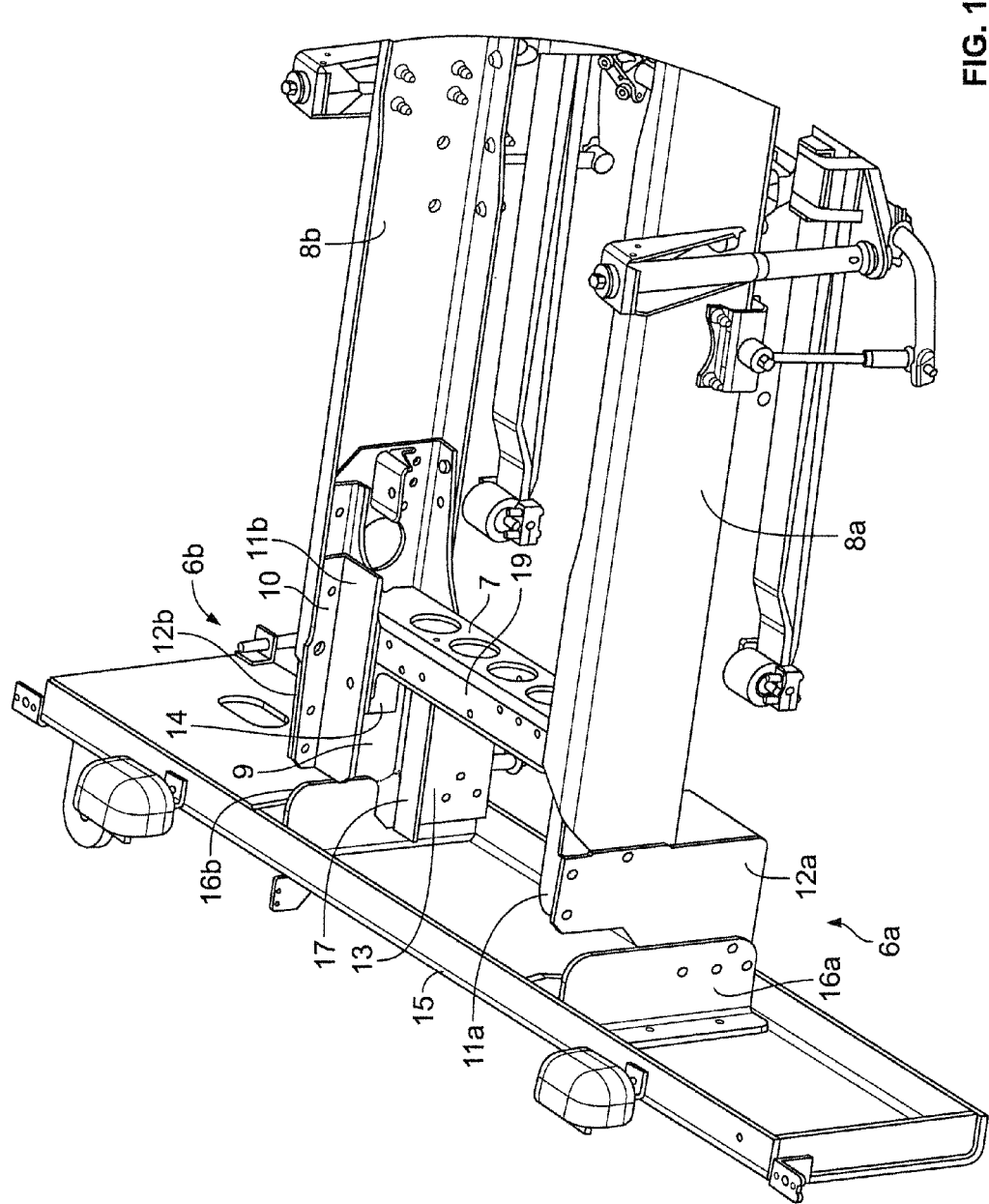
FIG. 1 is a top perspective view of the front portion of a frame of a vehicle with a first embodiment of the frame extension installed.

In a first embodiment of the frame extension and method of the invention, illustrated in FIG. 1, the frame extension is made up of eight parts that are bolted together and to the frame of the truck. More specifically, four parts are bolted together and to one frame rail, and four parts are bolted together and to the other frame rail. Some of the original equipment bolts that hold the cab to the frame rails may be used to attach the frame extensions in some installations.

With reference to FIG. 1, the front portions of the frame rails 8*a* and 8*b* of a vehicle are shown. The frame rails are joined by a cross member 7 having a top flange 19 and a bottom flange (such as 33 in FIGS. 4 and 5). A pair of frame extensions in a first embodiment of the invention are indicated in general at 6*a* and 6*b*. The frame extensions include top brackets that feature inward extending, top horizontal members 11*a* and 11*b* and upward extending, vertical portions (illustrated at 10 for bolt-on frame extension 6*b*). The trailing ends of the vertical portions 10 of the top brackets are bolted to the frame rails 8*a* and 8*b* adjacent to top flanges of the frame rails. The leading ends of the vertical portions 10 of the top brackets are bolted to a pair of generally vertical outer plates 12*a* and 12*b*. The top horizontal members 11*a* and 11*b* of the top brackets rest on the top side of the top flange 19 of cross member 7 and may optionally be connected thereto.

The outer plates 12*a* and 12*b* feature a pair of inward extending, middle horizontal members, shown at 9 for outer plate 12*b*. A pair of spacer blocks (illustrated at 14 for bolt-on frame extension 6*b*) are positioned between the top horizontal members 11*a* and 11*b* of the top brackets and the middle horizontal members 9 of the outer plates 12*a* and 12*b*. The spacer blocks bolt to both the top and middle horizontal members. The middle horizontal members may engage the underside of the top flange 19 of the cross member (such as if a downward lip or sufficient thickness is provided by the top flange) or may otherwise engage the cross member.

A pair of bottom brackets have downward extending vertical portions (shown at 13 for bolt-on frame extension 6*b*) and inward extending horizontal portions (illustrated at 17 for bolt-on frame extension 6*b*). The inward extending horizontal portions form the bottom horizontal members of the bolt-on frame extensions 6*a* and 6*b*. The trailing ends of the bottom horizontal members of the bottom brackets bolt to a bottom flange (that opposes top flange 19) of the cross member 7.

An aftermarket vocational bumper 15 features a pair of mounting tabs 16*a* and 16*b* that bolt to the outer-facing surfaces of the outer plates 12*a* and 12*b*. The vertical portions of the bottom brackets are attached to the inner-facing surfaces of the outer plates 12*a* and 12*b* using the same bolts used to hold the tabs 16*a* and 16*b* of bumper 15 to the outer plates. As a result, the outer plates 12*a* and 12*b* are sandwiched between the bumper mounting tabs 16*a* and 16*b* and the vertical portions 13 of the bottom brackets.

Each of the top bracket, outer plate, bottom bracket and spacer are preferably constructed from steel, but alternative durable materials may be used.

Figure 3:
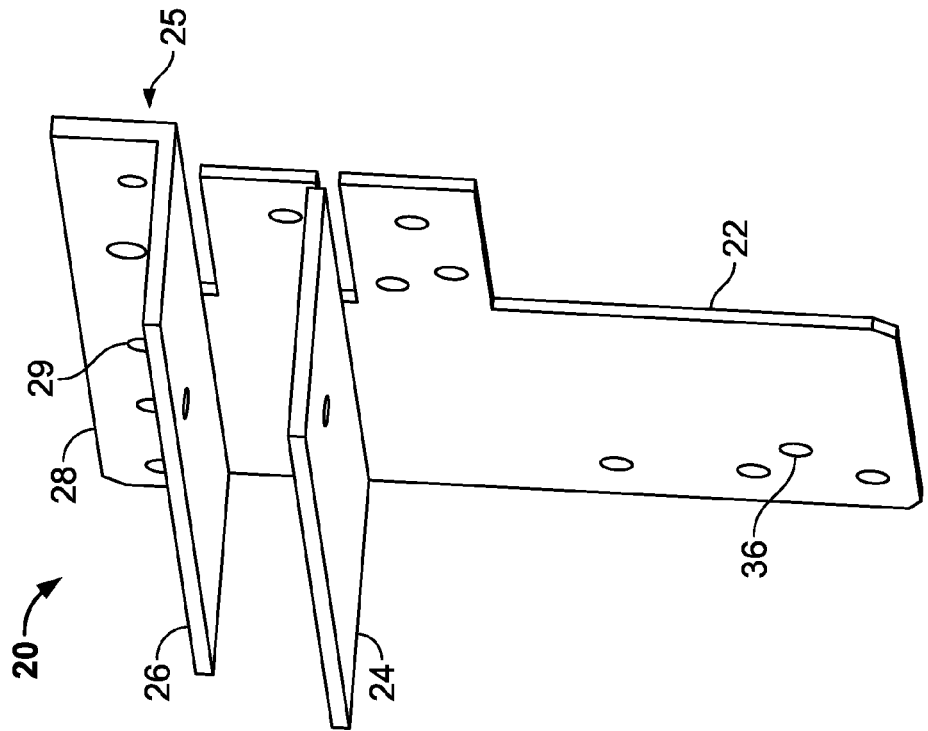
FIG. 3 is a bottom perspective view of the frame extension of FIG. 2.
Figure 2:
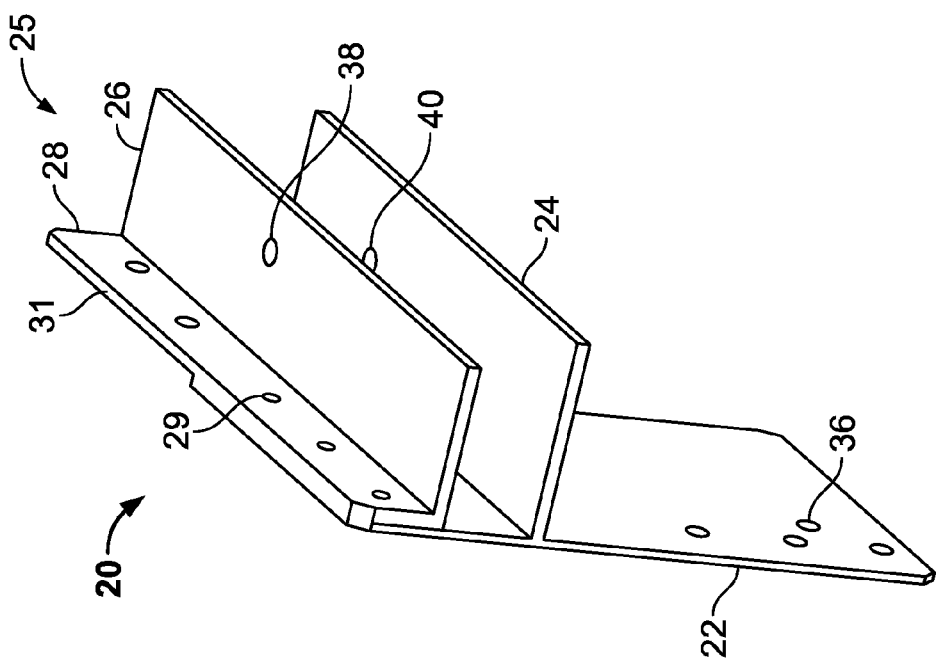
FIG. 2 is a top perspective view of a second embodiment of the frame extension of the present invention.
Figure 4:
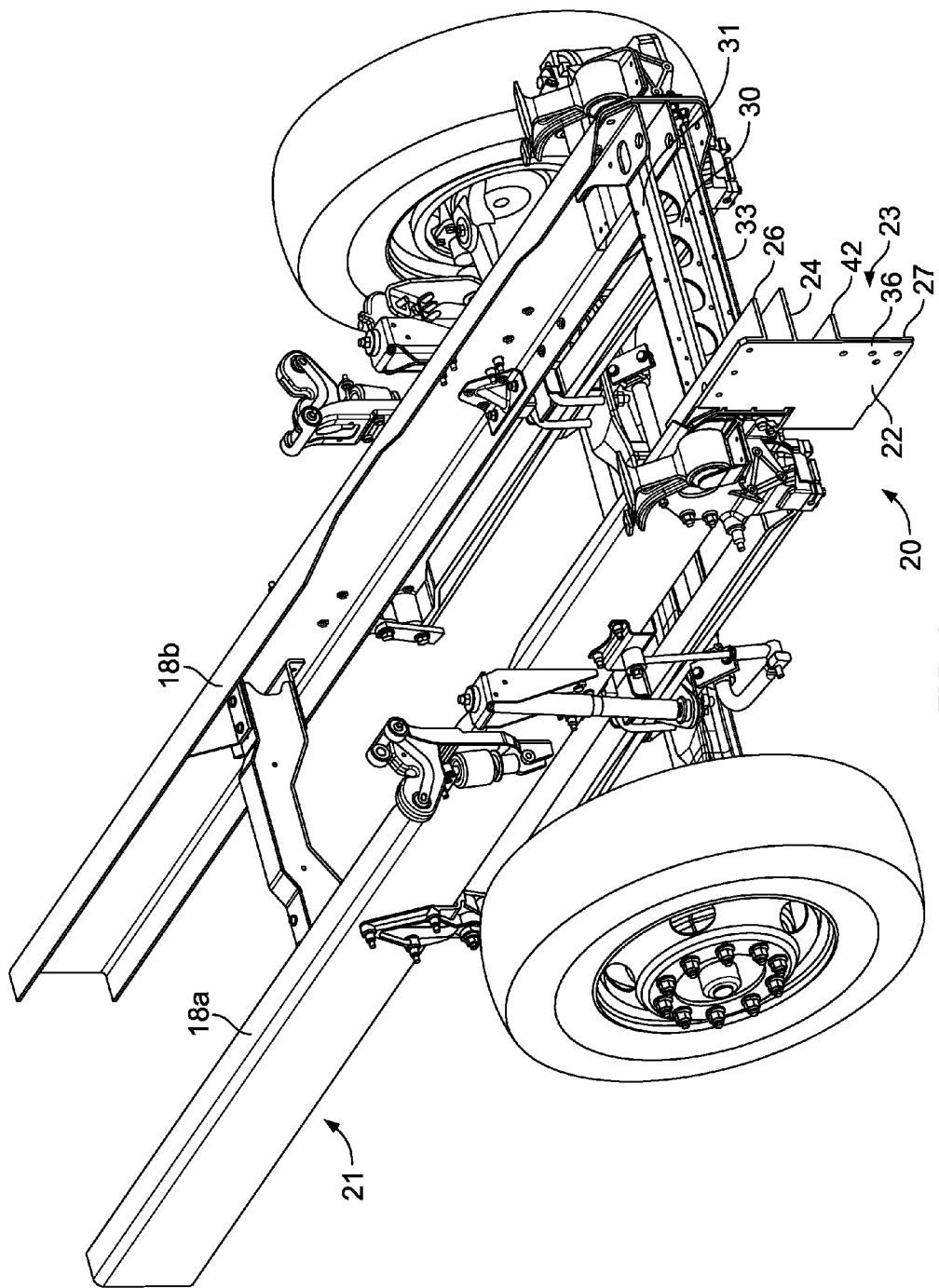
FIG. 4 is a top perspective view of the front portion of a frame of a vehicle with the frame extension of FIGS. 2 and 3 installed showing the outer side of the frame extension.

A second embodiment of the frame extension of the invention is indicated in general at 20 in FIGS. 2-4. The frame extension 20 is shown mounted to frame rail 18*a* of truck frame 21. It is to be understood that, while only frame extension 20 is described below, a mirror image of the frame extension 20 is mounted on frame rail 18*b*.

As shown in FIGS. 2 and 3, the bolt-on frame extension 20 includes an outer plate 22 featuring a middle horizontal member 24. A top bracket 25 includes a horizontal portion 26, that forms a top horizontal member for the bolt-on frame extension, and a vertical portion 28.

Figure 5:
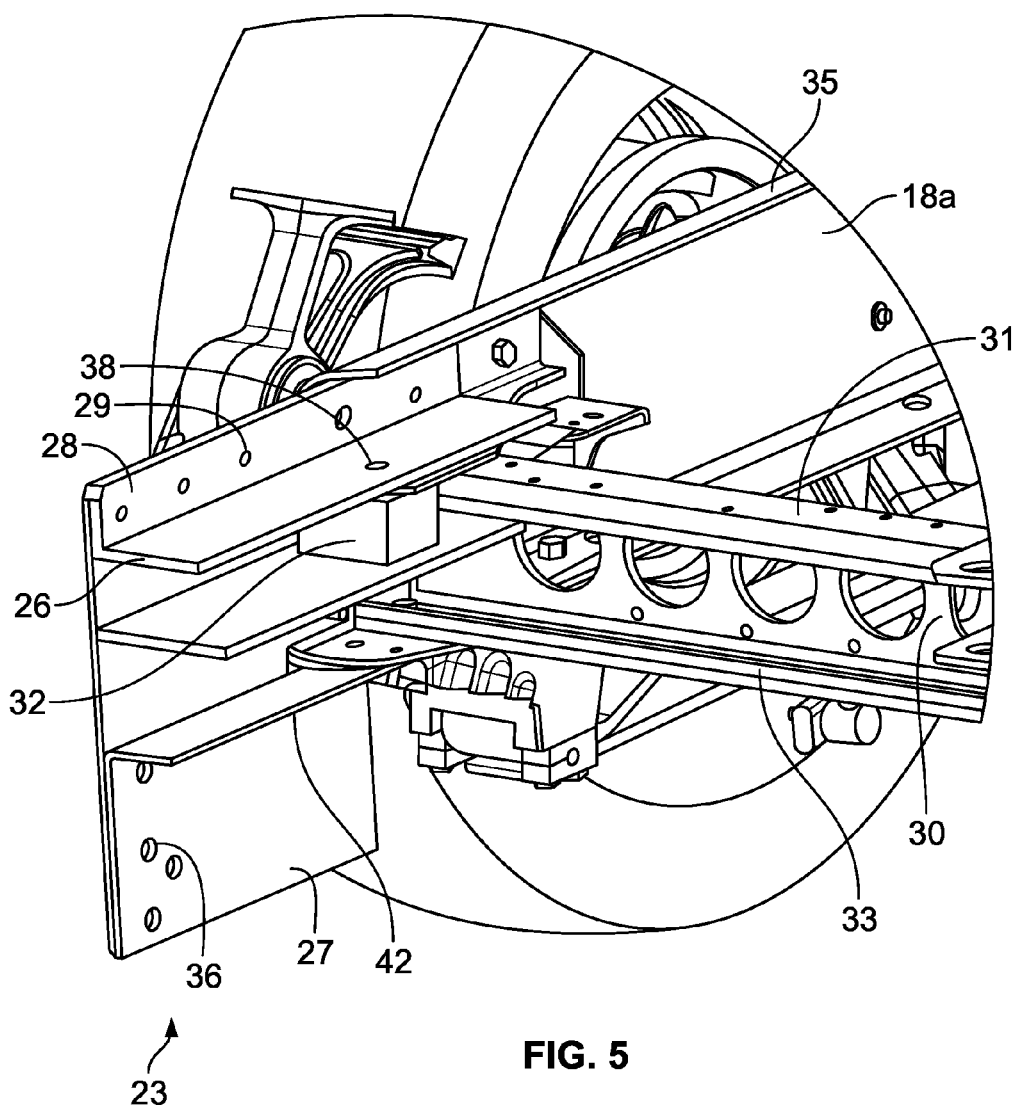
FIG. 5 is a top perspective view of the front portion of the vehicle frame and the frame extension of FIG. 4 showing the inner side of the frame extension.

With reference to FIGS. 4 and 5, the truck frame rails 18*a* and 18*b* are joined by a cross member 30 having a top flange 31 and a bottom flange 33. The trailing end of the vertical portion 28 of the top bracket 25 is bolted to the leading end portion of frame rail 18a adjacent to a top flange 35. The leading end of the vertical portion 28 is bolted to the generally vertical outer plate 22 via bolt holes 29. The top horizontal member 26 of the top bracket rests on the top side of the top flange 31 of cross member 30 and may optionally be connected thereto.

A spacer block, illustrated at 32 in FIG. 5, is positioned between the top horizontal member 26 of the top bracket 25 and the middle horizontal member 24 of the outer plate 22. With reference to FIGS. 2 and 5, the spacer block bolts to both the top and middle horizontal members via bolt holes 38 and 40, respectively. The middle horizontal members may engage the underside of the top flange 31 of the cross member (such as if a downward lip or sufficient thickness is provided by the top flange) or may otherwise engage the cross member.

A bottom bracket, indicated in general at 23 in FIGS. 4 and 5, features a downward extending vertical portion 27 and an inward extending horizontal portion 42. The inward extending horizontal portion 42 forms the bottom horizontal member of the bolt-on frame extensions 20. The trailing end of the bottom horizontal member 42 bolts to the bottom flange 33 of the cross member 30.

An aftermarket accessory bolts to the outer-facing surface of the outer plate 22 (and the outer surface of the outer plate mounted to frame rail 18b) via bolt holes 36. The vertical portion 27 of the bottom bracket 23 is attached to the inner-facing surface of the outer plate 22 using the same bolts and bolt holes 36 used to hold the accessory to the outer plate 22. As a result, the outer plate 22 is sandwiched between the accessory mounting tab or bracket and the vertical portion 27 of the bottom bracket 23.

Each of the top bracket, outer plate, bottom bracket and spacer are preferably constructed from steel, but alternative durable materials may be used.

While the top and bottom brackets and outer plate of the above embodiments are shown as separate components, they alternatively may be constructed as a single component.

The frame extension of the present invention may be easily and securely installed in a limited space, yet it provides a very strong structure for the accessory to attach to.

While the preferred embodiments of the invention have been shown and described, it will be apparent to those skilled in the art that changes and modifications may be made therein without departing from the spirit of the invention, the scope of which is defined by the following claims.

What is claimed is:

1. An extension for a vehicle having a frame rail and a cross member with a top flange and a bottom flange, with the cross member connected to the frame rail, the extension comprising:
   a. a top bracket having a vertical portion and a top horizontal member, said top bracket vertical portion having a leading end portion and a trailing end portion, said trailing end portion adapted to be attached to the frame rail and said top horizontal member adapted to engage the cross member top flange;
   b. an outer plate attached to the leading end portion of the vertical portion of the top bracket and having a middle horizontal member;
   c. a spacer block positioned between and attached to the top horizontal member of the top bracket and the middle horizontal member of the outer plate; and
   d. a bottom bracket having a vertical portion and a bottom horizontal member, said bottom bracket vertical portion attached to the outer plate and said bottom horizontal member adapted to be attached to the bottom flange of the cross member;
   wherein said middle horizontal member is positioned between said top horizontal member and said bottom horizontal member.

2. The extension of claim 1 wherein the outer plate and the top bracket are separate components.

3. The extension of claim 1 wherein the spacer block is bolted to the top horizontal member of the top bracket and the middle horizontal member of the outer plate.

4. The extension of claim 1 wherein the top bracket, the outer plate and the bottom bracket are separate components.

5. The extension of claim 1 wherein the top bracket, the outer plate and the bottom bracket are constructed from steel.

6. A method of extending a frame of a vehicle, the method comprising the steps of:
   a. providing a vehicle having a frame rail and a cross member with a top flange and a bottom flange, with the cross member connected to the frame rail;
   b. providing a top bracket having a vertical portion and a top horizontal member, said top bracket vertical portion having a leading end portion and a trailing end portion, an outer plate having a middle horizontal member, a spacer block and a bottom bracket having a vertical portion and a bottom horizontal member, wherein said middle horizontal member is positioned between said top horizontal member and said bottom horizontal member;
   c. attaching the trailing end portion of the top bracket vertical portion to the frame rail;
   d. engaging the cross member top flange with the top horizontal member of the top bracket;
   e. attaching the outer plate to the leading end portion of the vertical portion of the top bracket;
   f. fastening the spacer block between the top horizontal member of the top bracket and the middle horizontal member of the outer plate;
   g. attaching the bottom bracket vertical portion to the outer plate; and
   h. attaching the bottom horizontal member to the bottom flange of the cross member.

7. The method of claim 6 wherein all attachments are made using bolts.

8. A kit of parts for extending a frame of a vehicle where the vehicle has a frame rail and a cross member with a top flange and a bottom flange, with the cross member connected to the frame rail, comprising:
   a. a top bracket having a vertical portion and a top horizontal member, said top bracket vertical portion having a leading end portion and a trailing end portion, said trailing end portion adapted to be attached to the frame rail and said top horizontal member adapted to engage the cross member top flange;
   b. an outer plate adapted to be attached to the leading end portion of the vertical portion of the top bracket and having a middle horizontal member;
   c. a spacer block adapted to be positioned between and adapted to be attached to the top horizontal member of the top bracket and the middle horizontal member of the outer plate; and
   d. a bottom bracket having a vertical portion and a bottom horizontal member, said bottom bracket vertical portion adapted to be attached to the outer plate and said bottom horizontal member adapted to be attached to the bottom flange of the cross member;

wherein said middle horizontal member is positioned between said top horizontal member and said bottom horizontal member.

9. The kit of parts of claim 8 wherein the top bracket, the outer plate and the bottom bracket are constructed from steel.

10. The kit of parts of claim 8 wherein the spacer block is adapted to be attached to the top horizontal member of the top bracket and the middle horizontal member of the outer plate by bolts.

11. An extension for a vehicle having a frame rail and a cross member with a top flange and a bottom flange, with the cross member connected to the frame rail, the extension comprising:

a top bracket having a top horizontal member configured to engage the top flange of the cross member and a vertical portion configured to attach to the frame rail;

an outer plate having an outer-facing surface, an inner-facing surface opposite the outer-facing surface and attached to the vertical portion of the top bracket such that the top horizontal member of the top bracket extends away from the inner-facing surface, and a middle horizontal member that extends from the inner-facing surface;

a spacer block positioned between and attached to the top horizontal member and the middle horizontal member; and a bottom bracket having a vertical portion attached to the inner-facing surface and a bottom horizontal member that extends away from the inner-facing surface and is configured to attach to the bottom flange of the cross member;

wherein the middle horizontal member is positioned between the top horizontal member and the bottom horizontal member.

12. The extension of claim 11 wherein the outer plate and the top bracket are separate components.

13. The extension of claim 11 wherein the spacer block is bolted to the top horizontal member of the top bracket and the middle horizontal member of the outer plate.

14. The extension of claim 11 wherein the top bracket, the outer plate and the bottom bracket are separate components.

15. The extension of claim 11 wherein the top bracket, the outer plate and the bottom bracket are constructed from steel.

* * * * *

UNITED STATES PATENT AND TRADEMARK OFFICE
CERTIFICATE OF CORRECTION

PATENT NO. : 9,771,041 B2
APPLICATION NO. : 14/687077
DATED : September 26, 2017
INVENTOR(S) : Dan R. Jaynes Page 1 of 1

It is certified that error appears in the above-identified patent and that said Letters Patent is hereby corrected as shown below:

In the Claims

In Column 4, Claim 6, Line 28, that portion reading "spacer block and a bottom bracket" should read --spacer block, and a bottom bracket--.

Signed and Sealed this
Twenty-eighth Day of November, 2017

Joseph Matal
*Performing the Functions and Duties of the*
*Under Secretary of Commerce for Intellectual Property and*
*Director of the United States Patent and Trademark Office*